M. D. Whipple.
Combing Mach.
N° 16,865.   Patented Mar. 17, 1857.
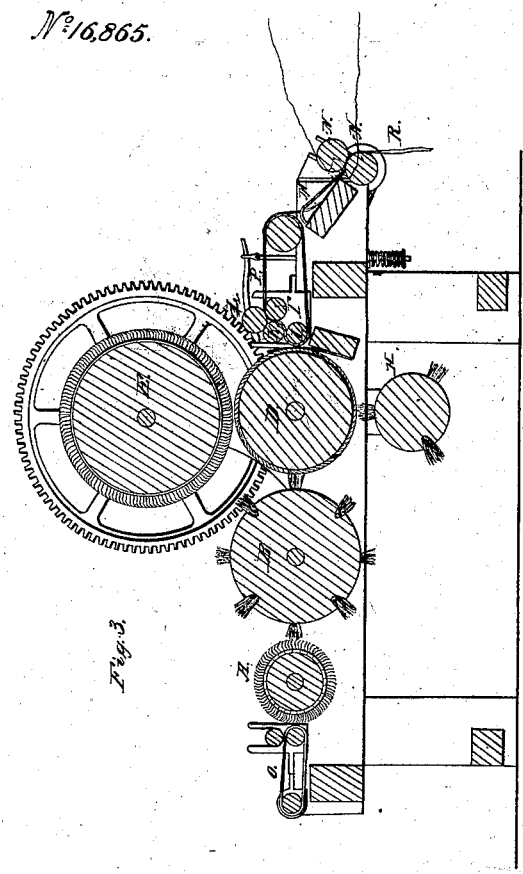
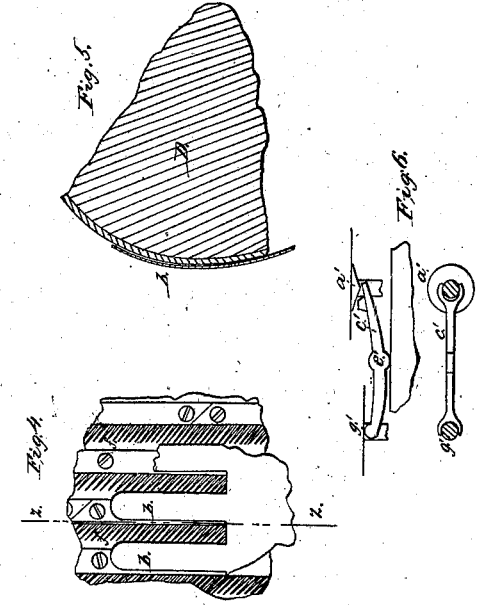
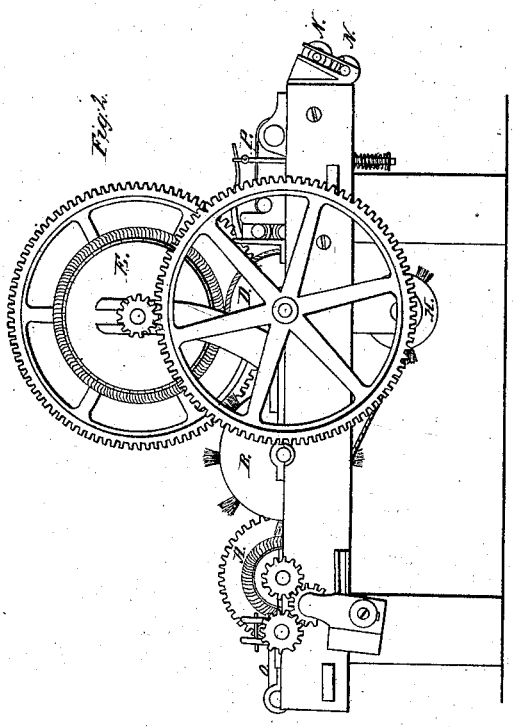
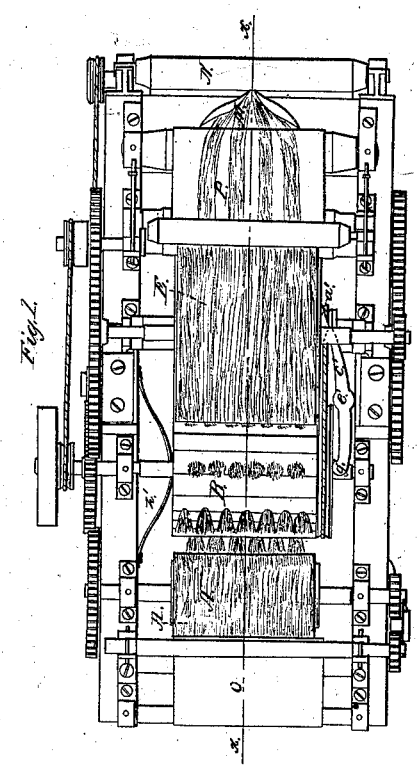

UNITED STATES PATENT OFFICE.

MILTON D. WHIPPLE, OF CHARLESTOWN, MASSACHUSETTS, ASSIGNOR TO A. B. ELY.

MACHINE FOR COMBING FIBROUS MATERIALS.

Specification of Letters Patent No. 16,865, dated March 17, 1857.

*To all whom it may concern:*

Be it known, that I, MILTON D. WHIPPLE, of Charlestown, in the county of Middlesex and State of Massachusetts, have invented certain new and useful Improvements in Machines for Combing Fibrous Materials, of which the following is a full, clear, and exact description, reference being had to the annexed drawings, making part of this specification, in which—

Figure 1 is a plan; Fig. 2, a side elevation; Fig. 3, a vertical section upon the line X X of Fig. 1; Fig. 4 a portion of the comb cylinder and guards enlarged; Fig. 5, a section upon the line Z Z of Fig. 4; Fig. 6, details that will be referred to hereafter.

Long staple cotton has been prepared by combing it upon machines having a single circle of teeth as in the ordinary wool combers. The operation of such machines is however slow and the amount of work of which they are capable too limited to render them of any practical value, except for the most costly fabrics.

My invention has for its object to increase the capabilities of such machines by such modifications and improvements as shall enable them to perform a much greater amount of work than they have ever before been capable of, and this I effect by placing the comb teeth in an inclined position upon the surface of a cylinder and operating them in conjunction with a guard which will be hereafter more fully explained, whereby an indefinite number of circles of comb teeth may be employed and the capabilities of the machine greatly increased.

In the accompanying drawings O is the feed apron upon which the raw cotton is spread and by which it is carried into the machine; from this apron it is received by the lickerin A which delivers it to the main cylinder B; this cylinder is constructed of brushes as seen in the drawings and transfers the cotton received from the lickerin on to the comb cylinder D the construction of which will now be described.

In combing machines as heretofore constructed it has not been found practicable to employ more than one circle of teeth at a time, owing to the difficulty of so arranging the rolls with reference to them that they shall draw the material through their teeth and not off their points. To overcome this difficulty and to enable me to make use of an indefinite number of circles of teeth I arrange the latter so that they shall be within the surface of a cylinder, and in a direction inclined to its axis, and while the fibers are being drawn from them the points of the teeth pass under suitable guards by which construction and arrangement I am enabled to adapt a single pair of draft rolls to a cylinder of indefinite length and to place the axes of these rolls perpendicular to the direction of motion of the teeth, whereby any number of circles of teeth may be employed upon the cylinder and a proportionate amount of work performed.

In Fig. 4 is seen a portion of the comb cylinder enlarged and in Fig. 5 a section upon the line Z Z of Fig. 4. Each circle of teeth has its guard $b$ which covers the points of the teeth $f$ during the time that the draft is being made.

The main cylinder B which transfers the cotton on to the comb cylinder is caused to traverse back and forth in the direction of its axis a distance at least equal to the distance between the circles of points that the surface of the main cylinder may be equably cleansed; in the machine represented in the accompanying drawings this is effected by the following device $a'$ (Figs. 1 and 6) is a cam attached to the comb cylinder D which as it revolves moves the lever $c'$ which is pivoted to the frame at $e'$, the other end of this lever pressing against the end of the cylinder B at $g'$ moves the cylinder in the line of its axis the required distance the spring $h'$ serving to force it back again when the lever $c'$ is relieved by the cam. In lieu of this construction the main cylinder may be placed with its axis inclined to that of the comb cylinder, that it may the more perfectly brush the fibers on the teeth of the combs; this inclination should be such that the brushes shall revolve in plains parallel with the teeth or very nearly so.

After the material is placed upon the combing cylinder D it is subjected to the action of the carding cylinder E by which the fibers are disentangled and straightened out, they are then drawn out from the comb teeth as follows: I I' are rolls revolving in stationary bearings and carrying the apron P; K is a weighted roll which operates with the roll I to draw the fibers from the comb teeth $f$ . At the point where these rolls operate the teeth pass beneath guards $b$, $b$, which prevent the noil, knobs, and uncombed cotton from being drawn off with the straightened fibers as before explained. The separate slivers are thus lead off by the apron P and are united into a sliver R by the funnel M which delivers it to the calender rolls N.

Above the rolls I' and K lies the clearer L the object of which is to prevent the cotton from lapping around the roll K.

The carding cylinder E may be cleared by a rapidly revolving brush and the comb cylinder is cleared of any knobs or dirt which remain as noil within its teeth after the cotton is withdrawn by the revolving brush H.

About one half of the cotton is thus rapidly drawn out forming a very beautiful and even sliver, which surpasses anything that can be produced upon carding engines as now constructed while the amount of work of which the machine is capable far exceeds that which can be done by cards occupying an equal space upon the floor. The remainder of the cotton which is thrown off the comb cylinder by the brush H and which is already partially opened and carded is to be finished upon the ordinary carding engines and devoted to purposes not requiring the longest of the staple.

What I claim as my invention and desire to secure by Letters Patent is—

Inclining the comb teeth to the axis of the cylinder and covering them with the guard at the point of draft in the manner substantially as herein set forth for the purpose specified.

MILTON D. WHIPPLE.

Witnesses:
SAM. COOPER,
THOS. R. ROACH.